US012634356B2

(12) United States Patent
Daniel et al.

(10) Patent No.: US 12,634,356 B2
(45) Date of Patent: May 19, 2026

(54) SYSTEMS AND METHODS FOR ANALYZING CONTENT FROM VIRTUAL WHITEBOARDS

(71) Applicant: Theta Lake, Inc., Santa Barbara, CA (US)

(72) Inventors: Tara Daniel, Goodlettsville, TN (US); Ryan Johnson, Rigby, ID (US); Daniel Oshiro Nadir, Carlsbad, CA (US); Richard B. Sutton, San Mateo, CA (US); Devin H. Redmond, Encinitas, CA (US); Marc Gregory Gilman, New York, NY (US)

(73) Assignee: THETA LAKE, INC., Santa Barbara, CA (US)

( * ) Notice: Subject to any disclaimer, the term of this patent is extended or adjusted under 35 U.S.C. 154(b) by 329 days.

(21) Appl. No.: 18/306,826

(22) Filed: Apr. 25, 2023

(65) Prior Publication Data

US 2024/0364759 A1     Oct. 31, 2024

(51) Int. Cl.
*H04L 65/401*          (2022.01)

(52) U.S. Cl.
CPC ................................ *H04L 65/4015* (2013.01)

(58) Field of Classification Search
CPC ................................ H04L 65/4015; G06F 3/00
See application file for complete search history.

(56) References Cited

U.S. PATENT DOCUMENTS

| | | | |
|---|---|---|---|
| 7,024,456 B1 * | 4/2006 | Simonoff | .............. H04L 67/131 |
| | | | 719/329 |
| 8,639,719 B2 | 1/2014 | Fisher et al. | |
| 8,994,732 B2 | 3/2015 | Lee et al. | |
| 10,552,546 B2 | 2/2020 | Nelson et al. | |
| 11,438,233 B1 | 9/2022 | Nadir et al. | |
| 2008/0008458 A1 * | 1/2008 | Gudipaty | ............... H04N 7/147 |
| | | | 348/E7.083 |
| 2014/0105563 A1 * | 4/2014 | Voorhees | ............. G09B 21/003 |
| | | | 386/224 |
| 2015/0007055 A1 * | 1/2015 | Lemus | .................. G06F 3/0484 |
| | | | 715/753 |
| 2015/0355824 A1 * | 12/2015 | Ueno | .................. G06F 3/04845 |
| | | | 715/751 |
| 2016/0202845 A1 * | 7/2016 | Findeisen | ............. H04L 67/131 |
| | | | 715/744 |
| 2019/0250800 A1 * | 8/2019 | Coldham | ............... G11B 27/34 |

(Continued)

OTHER PUBLICATIONS

Cruz, Robert, "Capture and Control: Keys to Staying Ahead of Today's Communications Disruptions", Smarsh, Feb. 20, 2019, https://www.smarsh.com/thought-leadership/capture-and-control-keys-to-staying-ahead-of-todays-communications-disruption/ (Year: 2019).*

*Primary Examiner* — Lesa M Kennedy

(74) *Attorney, Agent, or Firm* — Sprinkle IP Law Group

(57) ABSTRACT

A system and method enables an organization to easily analyze content from virtual whiteboards for any desired purpose, such as for identifying compliance risks for the organization. The system and method can provide the ability to analyze virtual whiteboard activities and content, including the ability to provide searchability and discoverability. Using content downloaded from a whiteboard provider, including whiteboard objects, coordinate metadata, and activity logs, the system can recreate, on an object-by-object basis, a virtual whiteboard at specific points in time, as desired.

20 Claims, 3 Drawing Sheets

(56)  References Cited

U.S. PATENT DOCUMENTS

| 2019/0303178 A1* | 10/2019 | Mastracci | ........... G06F 11/3636 |
| 2023/0069524 A1 | 3/2023 | Hüffner et al. | |
| 2024/0037509 A1* | 2/2024 | Alurkar | ............. G06Q 10/1091 |

* cited by examiner

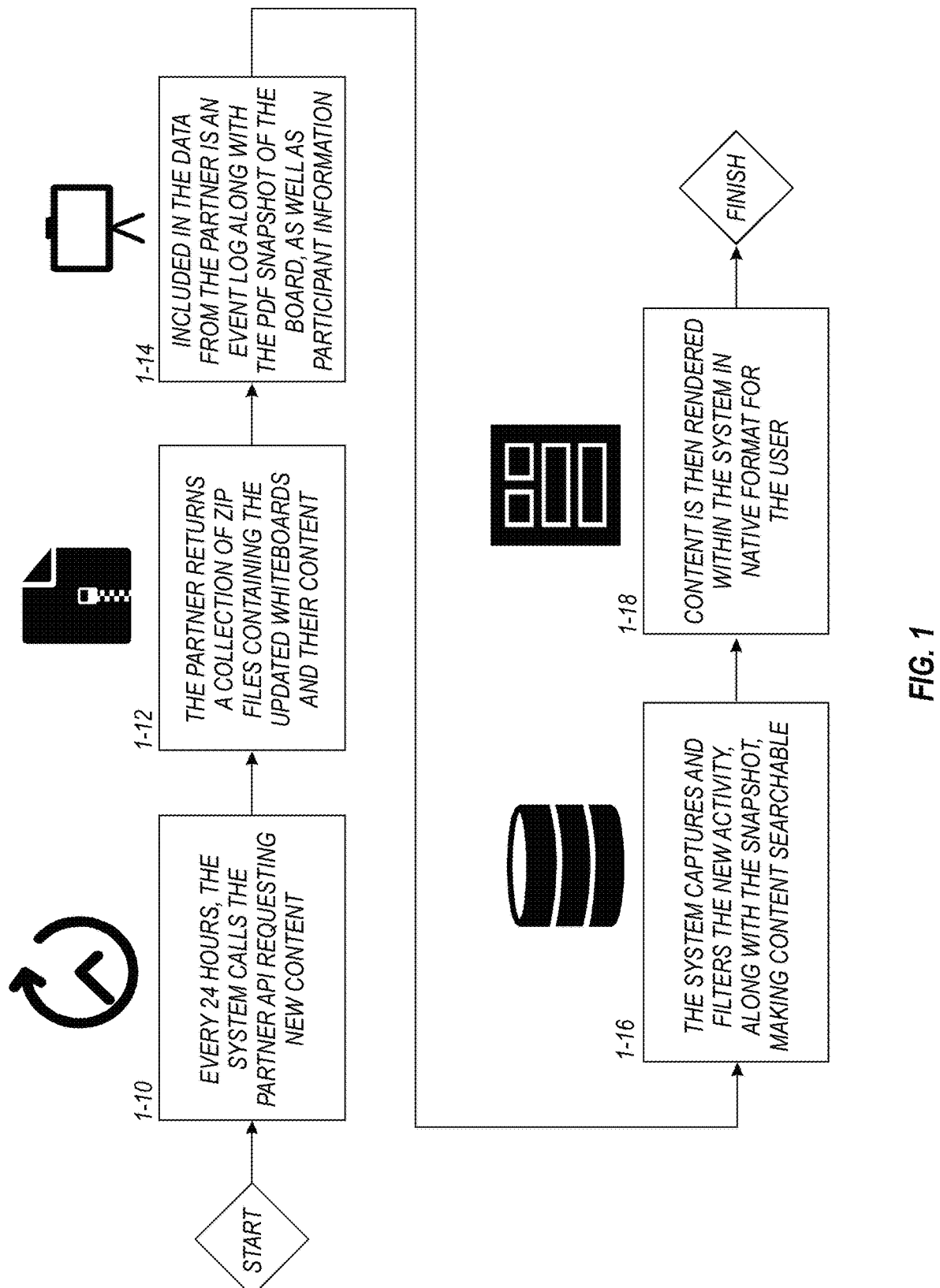

1-10 EVERY 24 HOURS, THE SYSTEM CALLS THE PARTNER API REQUESTING NEW CONTENT

1-12 THE PARTNER RETURNS A COLLECTION OF ZIP FILES CONTAINING THE UPDATED WHITEBOARDS AND THEIR CONTENT

1-14 INCLUDED IN THE DATA FROM THE PARTNER IS AN EVENT LOG ALONG WITH THE PDF SNAPSHOT OF THE BOARD, AS WELL AS PARTICIPANT INFORMATION

1-16 THE SYSTEM CAPTURES AND FILTERS THE NEW ACTIVITY, ALONG WITH THE SNAPSHOT, MAKING CONTENT SEARCHABLE

1-18 CONTENT IS THEN RENDERED WITHIN THE SYSTEM IN NATIVE FORMAT FOR THE USER

START

FINISH

CALL WHITEBOARD
PROVIDER API 4-12

RECEIVE WHITEBOARD
CONTENT DATA 4-14

RECREATE WHITEBOARD 4-16

GENERATE DISPLAY OF
RECREATED WHITEBOARD 5-10

CALL WHITEBOARD
PROVIDER API 5-12

RECEIVE WHITEBOARD
SNAPSHOT AND ACTIVITY LOG 5-14

GENERATE DISPLAY OF WHITEBOARD
SNAPSHOT AND ACTIVITY LOG

SYSTEMS AND METHODS FOR ANALYZING CONTENT FROM VIRTUAL WHITEBOARDS

TECHNICAL FIELD

This disclosure relates generally to computer-based collaboration. More particularly, embodiments relate to the field of risk detection in the context of analyzing information from virtual whiteboards.

BACKGROUND

Virtual whiteboards are a popular mechanism for teams to collaborate in real time to brainstorm ideas. Virtual whiteboards are included as built-on components of collaboration tools like Zoom, Webex, Microsoft Teams, etc. Standalone virtual whiteboard applications like Miro and Mural provide similar functionality and can be used independently or in conjunction with a collaboration application.

However, when users are collaborating on virtual whiteboards, they may create, draw, share, discuss, or comment on sensitive, inappropriate, or other information (images, logos, text, videos, files, graphs, etc.) that creates human resources (HR), conduct, privacy, security, or compliance risks for an organization. To date, there are no automated mechanisms for analyzing whiteboard content to determine if risky, inappropriate, or other actions of interest occurred during a session. Manual review of a whiteboard session video would currently be the only method for review, but even this is generally unavailable because of the nature of whiteboard content. In addition, whiteboards can be infinite, and can hold large quantities of information, making whiteboard "recordings" unwieldy in size and resolution. The disclosed solution applies machine learning to this problem to identify and surface issues encountered during virtual whiteboard sessions.

Previous solutions for the supervision of virtual whiteboards have attempted to solve the problems discussed above in two ways (described below). Previous solutions encounter the following challenges, which current oversight and analysis tools cannot accommodate: infinite scroll, real-time activity, persistent whiteboards, non-text visual elements (e.g., drawings, charts, icons, etc.), and position-based context.

One type of solution to the problems discussed above involves using an image file snapshot of point-in-time whiteboard status. Some solutions provide a moment-in-time image snapshot of a whiteboard, stored as an image file. However, this image file shows the content on the whiteboard page present only at the time of the snapshot. These are often provided at infrequent intervals (e.g., at 24 hour intervals).

One problem with this type of solution is that the snapshot does not account for the real-time and persistent nature of a virtual whiteboard. For example, the snapshot does not provide information about what was added/removed from the whiteboard before or after the time of the capture. The snapshot also does not provide information about who added what content to the whiteboard. This type of solution also does not enable the whiteboard content to be searched.

Another type of solution to the problems discussed above involves using a video recording of a virtual whiteboard session in an attempt to review the interactions. This type of solution uses a video file of a whiteboard, showing actions taken on a virtual whiteboard over a span of time. These videos consist of the entirety of a collaboration meeting, including a portion of a meeting with a whiteboard, as well as a recording of the whiteboard portion provided by a dedicated whiteboarding application. While today such videos do not exist, such a video file (in theory) could show all visual actions (adds, edits, deletes), as well as the person performing the actions in some cases, taking place on the whiteboard for the duration of the recording.

One problem with this type of solution is that current tools will record a virtual whiteboard only within the context of a meeting. In other words, whiteboards are only recorded while in use during a meeting if the meeting is recorded. Such a video recording does not provide information about what was added/removed from the whiteboard before or after the time of the recording. This type of solution also does not allow whiteboard content to be searched, nor does it account for the persistent nature of whiteboards.

Additionally, both types of solutions outlined above have potentially significant impacts on customers and whiteboard providers due to file size. While it may be conceptually feasible to have frequent snapshots and recordings sufficient to capture all activity within whiteboards, it's often highly impractical to do so, and a snapshot at a particular or randomized interval (that could potentially miss content that was viewed but then erased) may not meet compliance requirements. For a virtual whiteboard provider, the scalability of exporting many gigabytes worth of whiteboard content per customer, across their customer base, would be extremely difficult. Likewise, the potential costs incurred for customers to store all of the image and recording data may be prohibitive.

SUMMARY

A system is provided including a memory, a processor, and a non-transitory, computer-readable storage medium storing a set of instructions executable by the processor, the set of instructions comprising instructions for: requesting content data relating to a virtual whiteboard from a whiteboard provider; receiving content data from the whiteboard provider, the content data further comprising: whiteboard object data corresponding to a plurality of whiteboard objects, the whiteboard object data including location metadata for each of the plurality of whiteboard objects, an activity log corresponding to user activities on the virtual whiteboard; recreating the virtual whiteboard based on the received content data; and generating a display of the recreated virtual whiteboard over a user interface of a computing device. In some embodiments, other types of whiteboard data can be available from a whiteboard provider, for example, live videos inside of whiteboards, links to websites, etc., as one skilled in the art would understand.

Another embodiment provides a system including a memory, a processor, and a non-transitory, computer-readable storage medium storing a set of instructions executable by the processor, the set of instructions comprising instructions for: requesting content data relating to a virtual whiteboard from a whiteboard provider; receiving content data from the whiteboard provider, the content data further comprising: one or more virtual whiteboard snapshots, an activity log corresponding to user activities on the virtual whiteboard; recreating the virtual whiteboard based on the received content data; and generating a display of the recreated virtual whiteboard over a user interface of a computing device.

Another embodiment provides a method including requesting content data relating to a virtual whiteboard from a whiteboard provider; receiving content data from the whiteboard provider, the content data further comprising:

whiteboard object data corresponding to a plurality of whiteboard objects, the whiteboard object data including location metadata for each of the plurality of whiteboard objects, an activity log corresponding to user activities on the virtual whiteboard; recreating the virtual whiteboard based on the received content data; and generating a display of the recreated virtual whiteboard over a user interface of a computing device.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 1 is a diagram illustrating details of an exemplary process for capturing activity logs and snapshots of virtual whiteboards.

DETAILED DESCRIPTION

Figure 3:
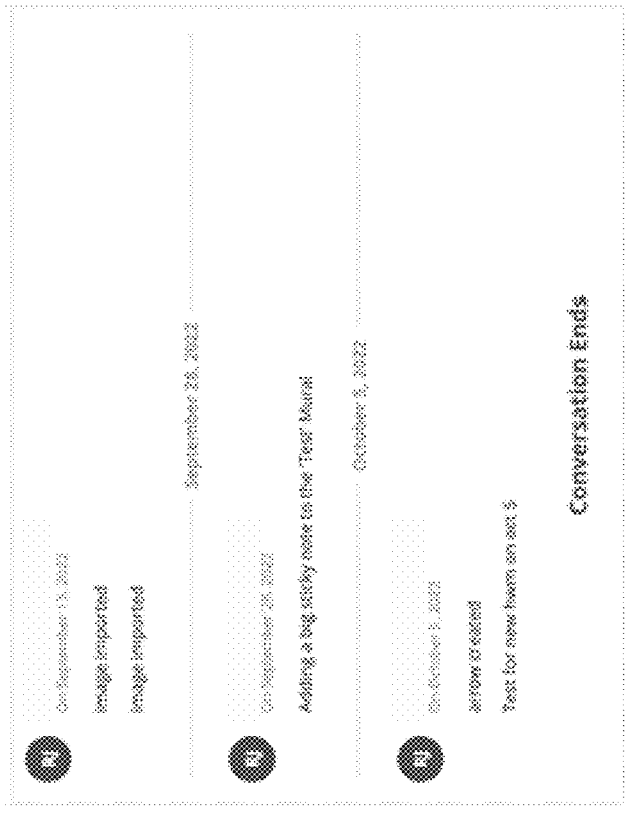
FIG. 3 shows a whiteboard stream that can be created based on the activity logs.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, a brief description of the context in which embodiments can be utilized may be helpful. As mentioned, collaborative applications, including virtual whiteboard applications, may pose risks to an organization if certain information is displayed during use of a virtual whiteboard. Embodiments described herein provide computer-based technologies to enable enterprises to add virtual whiteboards and related supervision to their toolset while adhering to their compliance, privacy, security, HR, and conduct policies. Embodiments relating to the enforcement of security and compliance controls for electronic data and communications may be better understood with reference to the following commonly-owned U.S. patent applications: U.S. patent application Ser. No. 17/378,481, entitled "SYSTEMS AND METHODS FOR MONITORING AND ENFORCING COLLABORATION CONTROLS ACROSS HETEROGENEOUS COLLABORATION PLATFORMS" by Nadir et al., filed on Jul. 16, 2021; U.S. patent application Ser. No. 17/883,221, entitled "SYSTEM AND METHOD FOR VISUAL IDENTIFICATION OF DISPLAYED APPLICATIONS IN ELECTRONIC COMMUNICATIONS" by Huffner et al., filed on Aug. 8, 2022; U.S. patent application Ser. No. 17/741,528, entitled "SYSTEM AND METHOD FOR ANALYZING REALTIME DATA FROM HETEROGENOUS COLLABORATION PLATFORMS TO IDENTIFY RISK" by Nadir et al., filed on May 11, 2022, each of which are incorporated herein by reference in their entireties for all purposes.

Generally, the disclosed systems and methods enable an organization to easily analyze content from virtual whiteboards for any desired purpose, such as for identifying compliance risks for the organization. Content added to a virtual whiteboard by users may include text, images, videos, files, icons, comments, stickie notes, sketches, etc. A virtual whiteboard is a "living document" that can be constantly updated by any of multiple users authorized to access the virtual whiteboard. The disclosed systems and methods can provide the ability to analyze virtual whiteboard activities and content, including the ability to provide searchability and discoverability. In some environments, especially with dedicated whiteboarding only applications, persistent whiteboards can exist in perpetuity, as opposed to whiteboards that are created during the course of an online meeting. In either situation, the techniques disclosed herein may be used.

In some embodiments, a whiteboard provider can make various types of information available to the system, such as through an application programming interface (API), web hook, downloads, SFTP, or other delivery mechanisms for exchanging data. Such information may include an activity log of a virtual whiteboard. The activity log may contain, among other items, user information, action information, timestamp information, etc. In some embodiments, the activity log can be sent in JavaScript Object Notation (JSON) format (or similar). Information from the whiteboard provider may also include text-based whiteboard content in JSON format (or similar). Text-based whiteboard content could include, for example, text boxes, comments, stickies, etc. The information provided by the whiteboard provider may also include non-text elements of the whiteboard as image files (e.g., images, embedded documents, icons, shapes, drawings, etc.). The information provided by the whiteboard provider may also include coordinate metadata for whiteboard objects (both the text and non-text content) relating to the location of the content with respect to the virtual whiteboard.

After receiving and ingesting the information described above, the system can resolve the problems discussed above by recreating the virtual whiteboard on demand, at any moment in the whiteboard's timeline, based on the information received from the whiteboard provider. The system can also accompany the recreated virtual whiteboard with a detailed account of how the whiteboard came to be at its present state. The system can also enable other functionality, such as applying optical character recognition (OCR) to non-text elements to extract text from images or from user writing via a finger/stylus. The system can also enable the dynamic replay of all or a portion of a whiteboard session to display only those segments of the whiteboard session where specific risks have been identified.

Embodiments described herein enable organizations to add digital/virtual whiteboards and related supervision to their toolset in an efficient and effective manner. Advantages of the disclosed solutions include leveraging lightweight files that allow organizations to easily scale the solution. In addition, ingesting virtual whiteboard activity logs, text content, and applying OCR allows the system to provide searchability and discoverability. Recreating virtual whiteboards on demand, including as dynamic replays, also provides organizations with critical visual contextual information.

Following is a first example of a process that captures activity logs and periodic snapshots of virtual whiteboard. The process can vary, depending on the particular whiteboard provider and the desired usage of the system.

1. Obtain whiteboard information from a whiteboard provider
2. Process the whiteboard information (e.g., store, make searchable, etc.)
3. Generate desired display(s)/reports of the processed whiteboard information
   a. Display snapshots of the whiteboard canvas with an accompanying activity log,
   b. Display a dynamic playback of relevant portions of a whiteboard session(s),
   c. Display information relating to activities of particular users,
   d. etc.

Following is a more specific example of a process that captures activity logs and periodic snapshots of virtual whiteboard.

1. Call the whiteboard provider API to retrieve and identify a list of unique whiteboard IDs
2. Create an export job for unique whiteboards from the whiteboard provider
   a. Export job is added to the processing queue
3. Retrieve href zip links
   a. href links added to the processing queue
4. Download the zip file contents
   a. Contents include: activity logs, whiteboard snapshots
5. Display a snapshot of the entire whiteboard canvas with an accompanying activity log and/or display a dynamic playback of the relevant portions of a whiteboard session As can be seen numerous other examples are also possible, as one skilled in the art would understand. The exemplary processes can vary, depending on the particular whiteboard provider and the desired usage of the system.

In one embodiment, at the beginning of the process, the system makes an API call to the whiteboard provider and essentially asks if any new whiteboards have been created, or if there is any new or changed content from an existing whiteboard. As noted above, in addition to API calls, a whiteboard provider can make information available to the system via any type of delivery mechanism for exchanging data. The system creates an export job for unique whiteboards from the whiteboard provider and essentially asks for all of the content for a given whiteboard. The system will retrieve href zip links, which are added to a processing queue. The system will then download the zip file contents and upload the contents to an ingester. The downloaded contents can include, for example, an activity log and any whiteboard snapshots (e.g., a PDF image). The system will save the content and make it searchable.

FIG. 1 is a process diagram illustrating details of an exemplary process outlined above. Numerous other exemplary processes are also possible, as one skilled in the art would understand. Generally, the process recreates a whiteboard from an activity log. Note that the activity data from the partner (e.g., a whiteboard provider) can be pulled using any desired mechanism, as one skilled in the art would understand. At the start of the process (step 1-10), the system periodically (e.g., every 24 hours, in one example) calls the partner API, requesting new content. At step 1-12, the partner returns data (in this example, a collection of ZIP files containing the updated whiteboards and their content). Step 1-14 illustrates that information included in the data returned from the partner includes an event log, along with PDF snapshots of the board, as well as participant information. At step 1-16, the system captures and filters the new activity, along with the snapshot(s), making the content searchable. At step 1-18, the content is rendered with the system in a native format for the user.

Figure 2:
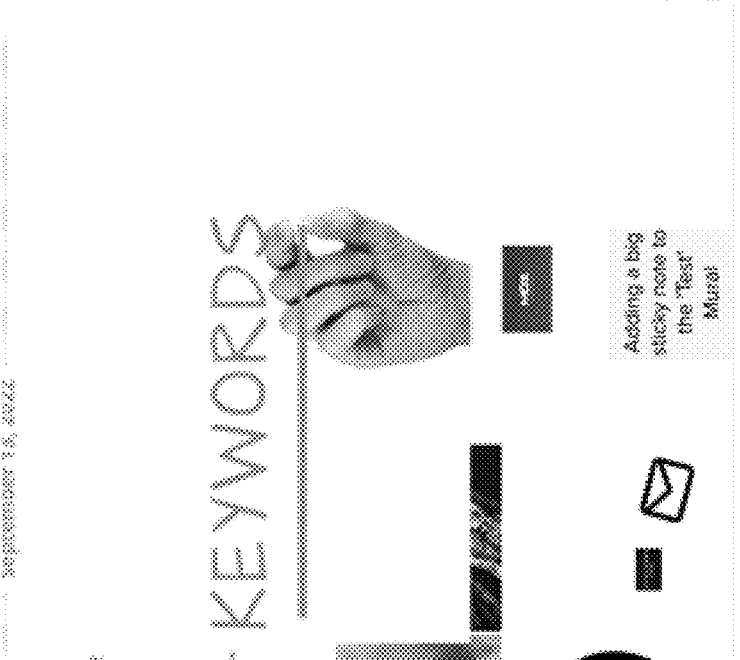
FIG. 2 shows an example of a snapshot of a whiteboard.

FIG. 2 shows an example of a snapshot of a whiteboard. The whiteboard includes various whiteboard objects, including text, images, icons, stickie notes, etc. If the whiteboard was an existing whiteboard, then the system will filter the data and determine which objects were already known and which are new or changed. As discussed above, the system will receive an activity log from the whiteboard provider that details activities and associated with the whiteboard, such as when users create/modify/delete whiteboard objects, user comments (creations, deletions, modifications, etc.), etc. In other examples, a user may identify specific portions of whiteboard sessions where potential risks (or other categories of activities) are identified to provide information about the activities at the identified whiteboard session portions. The information can be provided in any desired form, such as an animated, condensed view of the changes to the whiteboard over the time periods associated with identified portions.

FIG. 3 shows a whiteboard stream that can be created based on the activity logs. In the example, shown, the whiteboard stream shows various events, including timing information, users, and information about each event. As shown in the example of FIG. 3, at a first time, user RJ imported two images. At a second time, user RJ added a stickie note to the whiteboard. At a third time, user RJ created an arrow. In this example, at the bottom of the whiteboard stream, a list of participants to the whiteboard are shown. Note that, in this example, there are four participants, although, for the time period shown, only user RJ was active. Since the downloaded content is made searchable by the system, a user can perform complicated searches to the whiteboard data. For example, a user could search for any time periods where both users RF and MB were active. In another example, a user could search for any conversation that user RJ had been in, regardless of whether user RJ participated or not.

Also note that the whiteboard stream (FIG. 3) can show items that are not shown on the whiteboard snapshot (FIG. 2). For example, if participant MB created a comment, but then deleted the comment before the snapshot was taken, the comment would not appear on the snapshot, but would still be included in the whiteboard stream.

Following is another example of a process that captures activity logs and periodic snapshots of virtual whiteboard. The process can vary, depending on the particular whiteboard provider and the desired usage of the system. In this example, compared to the example above, more data elements are available to the system.

1. Obtain whiteboard information
   a. unique whiteboard IDs,
   b. activity logs,
   c. whiteboard snapshots,
   d. attachments or other whiteboard elements, and/or
   e. location metadata,
   f. etc.
2. Generate desired display(s)/reports of the whiteboard information Following is a more specific example of a process that captures activity logs and periodic snapshots of virtual whiteboard.

1. Call an endpoint to retrieve a list of unique whiteboard IDs
2. Create an export job for unique whiteboards from the whiteboard provider
   a. Jobs are added to the processing queue
3. Retrieve href zip links
   a. href links added to the processing queue
4. Download the zip file contents and upload them into the ingester
   a. contents include: activity logs, whiteboard snapshots, user-uploaded attachments, non-text whiteboard elements
5. Using location metadata (e.g., x, y coordinates) of the whiteboard objects, recreate, on an object-by-object basis, the whiteboard canvas at specific points in time as needed by a customer As can be seen numerous other examples are also possible, as one skilled in the art would understand. The exemplary processes can vary, depending on the particular whiteboard provider and the desired usage of the system.

At the beginning of the process, the system makes an API call to the whiteboard provider and essentially asks if any new whiteboards have been created, or if there is any new or changed content from an existing whiteboard. Note that, the system can obtain whiteboard information in other ways, as one skilled in the art would understand. Utilizing API calls is just one example. The system creates an export job for unique whiteboards from the whiteboard provider and essentially asks for all of the content for a given whiteboard. The system will retrieve href zip links, which are added to a processing queue. The system will then download the zip file contents and upload the contents to an ingester. The downloaded contents can include, for example, an activity log, and any whiteboard snapshots (e.g., a PDF image), user-uploaded attachments, non-text whiteboard elements, and information relating to any other whiteboard objects. The content also includes coordinate metadata for whiteboard objects relating to the location of the content on the virtual whiteboard. For example, if a user adds a whiteboard object (e.g., an image, stickie note, text, etc.), the coordinate metadata will indicate where on the whiteboard (e.g., using x, y coordinates, polar coordinates, or other position dependent system, etc.) the object was placed. Also note that a user comment will also have coordinate metadata, as the location of a comment placed on a whiteboard may provide important context to the comment.

Based on the provided content, including the coordinate metadata, the system can recreate, on an object-by-object basis, the whiteboard at specific points in time, as desired. For example, if a user wishes to see the state of the whiteboard at a specific date and time, the system can recreate the whiteboard based on the activity log, whiteboard object data, and coordinate meta, all without the need for a screenshot. The system can also dynamically play back specific portions of the whiteboard session where risks were identified to provide an animated, condensed view of the changes to the whiteboard over time. In other words, the disclosed system can essentially reproduce what was on a whiteboard at any given time in a customizable manner.

The whiteboard content data may also include vector files or links that can be called back to retrieve images and elements on the whiteboard to help the system repopulate (recreate) the whiteboard. For example, if a user creates an arrow on a whiteboard, the arrow may be created using an image or vector information. If the system is able to download vector information, the arrow can be recreated by the system without having to download an arrow image file.

As discussed above, embodiments of the disclosure can relate to the field of risk detection in the context of analyzing information from virtual whiteboards. The system described above facilitates that analysis by ingesting and aggregating the data (e.g., providing activity streams, recreated whiteboards, search results, etc.). Once the information is available and searchable, risks can be detected, for example by using machine learning based risk detection. Such machine learning techniques may leverage OCR, image detection, transcription analysis, etc., as is described in detail in the patent applications referenced above.

Figures 4, 5:
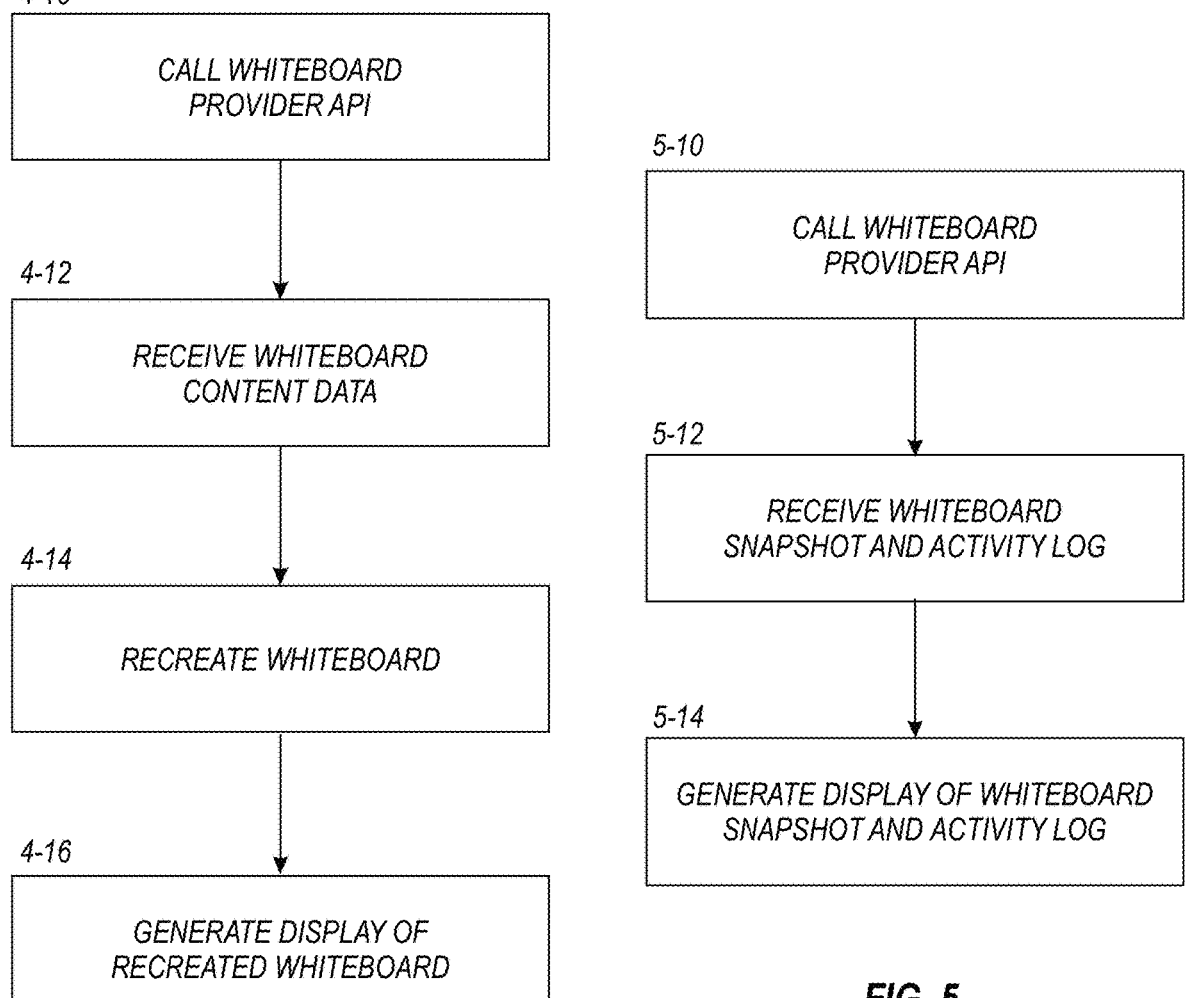
FIGS. 4-5 are flow charts illustrating exemplary embodiments of processes for generating and displaying recreations of virtual whiteboards for presentation to users.

FIGS. 4 and 5 are flow charts illustrating exemplary embodiments of processes for generating and displaying recreations of virtual whiteboards for presentation to users to enable easy analysis of information shared on the virtual whiteboards. The disclosed techniques can also be used for other purposes, as one skilled in the art would understand.

FIG. 4 is a flow chart illustrating a process for ingesting virtual whiteboard data and generating a recreated whiteboard at a given point in time. At step 4-10 a system makes an API call to a whiteboard provider to request information. In some embodiments, the information can include a list of unique whiteboard IDs. For new or changed whiteboards, the system can generate jobs that will request content from the whiteboard provider for each of the listed whiteboards. At step 4-12, whiteboard content data is received/downloaded from the whiteboard provider. The content data can include, for example, activity logs, whiteboard snapshots, user-uploaded attachments, non-text whiteboard elements, and any other type of whiteboard object. For each whiteboard object, the location metadata is included relating to the location of the respective whiteboard object on the virtual whiteboard. Also note that all of the ingested whiteboard data is stored and made searchable, as described in more detail above.

At step 4-14, the virtual whiteboard is recreated for a given time period, on an object-by-object basis, using the location metadata of the whiteboard objects present on the whiteboard at that time. At step 4-16, the system generates a display of the recreated whiteboard that is presented to a user over a user interface of a computing device. The generated display can be customized, as desired, based on the needs of the user, including presentation of a dynamic playback of the relevant portions of the whiteboard session. Other information can also be presented to the user, such as activity logs, whiteboard streams, statistics, search results, etc., as one skilled in the art would understand.

FIG. 5 is a flow chart illustrating a similar process for ingesting virtual whiteboard data and generating a display of a whiteboard snapshot and accompanying activity log. At step 5-10 a system makes an API call to a whiteboard provider to request information. In some embodiments, the information can include a list of unique whiteboard IDs. For new or changed whiteboards, the system can generate jobs that will request content from the whiteboard provider for each of the listed whiteboards. At step 5-12, whiteboard content data is received/downloaded from the whiteboard provider. The content data can include, for example, white-board snapshots and activity logs. At step 5-14, the system generates a display of the whiteboard snapshot and corre-sponding activity log. The generated display can be custom-ized, as desired, including as a dynamic playback, based on the needs of the user. As before, other information can also be presented to the user.

Reference throughout this specification to "one embodi-ment", "an embodiment", or "a specific embodiment" or similar terminology means that a particular feature, struc-ture, or characteristic described in connection with the embodiment is included in at least one embodiment and may not necessarily be present in all embodiments. Thus, respec-tive appearances of the phrases "in one embodiment", "in an embodiment", or "in a specific embodiment" or similar terminology in various places throughout this specification are not necessarily referring to the same embodiment. Fur-thermore, the particular features, structures, or characteris-tics of any particular embodiment may be combined in any suitable manner with one or more other embodiments. It is to be understood that other variations and modifications of the embodiments described and illustrated herein are pos-sible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, or the like. In other instances, well-known structures, components, systems, materials, or operations are not specifically shown or described in detail to avoid obscur-ing aspects of embodiments of the invention. While the invention may be illustrated by using a particular embodi-ment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combi-nation thereof. Within this disclosure, the term "computer readable medium" is not limited to ROM, RAM, and HD and can include any type of data storage medium that can be read by a processor. For example, a computer-readable medium may refer to a data cartridge, a data backup mag-netic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-execut-able instructions may be stored as software code compo-nents on a direct access storage device array, magnetic tape, floppy diskette, optical storage device, or other appropriate computer-readable medium or storage device.

Any suitable programming language can be used to implement the routines, methods, or programs of embodi-ments of the invention described herein, including C, C++, Java, JavaScript, HTML, or any other programming or scripting code, etc. Other software/hardware/network archi-tectures may be used. For example, the functions of the disclosed embodiments may be implemented on one com-puter or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combi-nation thereof.

Embodiments described herein can be implemented in the form of control logic in software or hardware or a combi-nation of both. The control logic may be stored in an information storage medium, such as a computer-readable medium, as a plurality of instructions adapted to direct an information processing device to perform a set of steps disclosed in the various embodiments. Based on the disclo-sure and teachings provided herein, a person of ordinary skill in the art will appreciate other ways to implement the invention.

It is also within the spirit and scope of the invention to implement in software programming or code the steps, operations, methods, routines, or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field pro-grammable gate arrays, optical, chemical, biological, quan-tum or nanoengineered systems, components and mecha-nisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only, but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

What is claimed is:

1. A system comprising:
   a memory;
   a processor; and
   a non-transitory, computer-readable storage medium storing a set of instructions executable by the processor, the set of instructions comprising instructions for:
   requesting content data relating to a virtual whiteboard from a whiteboard provider;
   receiving content data from the whiteboard provider, the content data further comprising:
   whiteboard object data corresponding to a plurality of whiteboard objects, the whiteboard object data including location metadata for each of the plurality of whiteboard objects,
   an activity log corresponding to user activities on the virtual whiteboard;
   analyzing the whiteboard object data, including text or image content within the plurality of whiteboard objects, to identify a risk;
   creating a dynamic playback of the virtual whiteboard based on the identified risk, wherein the dynamic playback selectively presents a portion of the virtual whiteboard activity corresponding to the identified risk; and
   generating a display of the dynamic playback of the virtual whiteboard over a user interface of a computing device.

2. The system of claim 1, wherein the content data is obtained using one of an application programming interface (API) call, web hooks, downloads, and SFTP.

3. The system of claim 1, wherein the location metadata for each of the plurality of whiteboard objects includes coordinates corresponding to a location on the virtual whiteboard.

4. The system of claim 1, wherein, for each whiteboard object, the whiteboard object data identifies a type of whiteboard object.

5. The system of claim 4, wherein each of the whiteboard objects is one of the following object types: a text object, an image object, a video object, and a note.

6. The system of claim 1, wherein the activity log contains information relating to whiteboard users and whiteboard activities associated with the whiteboard users.

7. The system of claim 1, wherein the activity log identifies users that are active at a given time.

8. A system comprising:
   a memory;
   a processor; and
   a non-transitory, computer-readable storage medium storing a set of instructions executable by the processor, the set of instructions comprising instructions for:
   requesting content data relating to a virtual whiteboard from a whiteboard provider;
   receiving content data from the whiteboard provider, the content data further comprising:
   one or more virtual whiteboard snapshots,
   an activity log corresponding to user activities on the virtual whiteboard;
   analyzing the whiteboard object data, including text or image content within the plurality of whiteboard objects, to identify a risk;
   creating a dynamic playback of the virtual whiteboard based on the identified risk, wherein the dynamic playback selectively presents a portion of the virtual whiteboard activity corresponding to the identified risk; and generating a display of the dynamic playback of the virtual whiteboard over a user interface of a computing device.

9. The system of claim 8, wherein the activity log contains information relating to whiteboard users and whiteboard activities associated with the whiteboard users.

10. The system of claim 8, wherein the activity log identifies users that are active at a given time.

11. The system of claim 8, wherein the recreated virtual whiteboard corresponds to one of the one or more virtual whiteboard snapshots.

12. The system of claim 8, further comprising:

storing the content data; and indexing the stored content data to make the content data searchable.

13. The system of claim 8, further comprising generating a display of the activity log.

14. A method comprising:

requesting content data relating to a virtual whiteboard from a whiteboard provider;

receiving content data from the whiteboard provider, the content data comprising whiteboard information relating to user activity on the whiteboard;

analyzing the whiteboard object data, including text or image content within the plurality of whiteboard objects, to identify a risk;

creating a dynamic playback of the virtual whiteboard based on the identified risk, wherein the dynamic playback selectively presents a portion of the virtual whiteboard activity corresponding to the identified risk; and generating a display of the dynamic playback of the virtual whiteboard conveying selective information from whiteboard information over a user interface of a computing device.

15. The method of claim 14, wherein the content data is obtained using one of an application programming interface (API) call, web hooks, downloads, and SFTP.

16. The method of claim 14, wherein the whiteboard information further comprises location metadata for each of the plurality of whiteboard objects including coordinates corresponding to a location on the virtual whiteboard.

17. The method of claim 14, wherein the whiteboard information further comprises whiteboard object data corresponding to a plurality of whiteboard objects, and wherein the whiteboard object data identifies a type of whiteboard object.

18. The method of claim 17, wherein each of the whiteboard objects is one of the following object types: a text object, an image object, a video object, and a note.

19. The method of claim 14, wherein the whiteboard information further comprises an activity log containing information relating to whiteboard users and whiteboard activities associated with the whiteboard users.

20. The method of claim 14, wherein the whiteboard information further comprises an activity log identifying users that are active at a given time.

* * * * *